United States Patent
Byron et al.

(10) Patent No.: US 10,942,958 B2
(45) Date of Patent: *Mar. 9, 2021

(54) USER INTERFACE FOR A QUERY ANSWERING SYSTEM

(71) Applicant: INTERNATIONAL BUSINESS MACHINES CORPORATION, Armonk, NY (US)

(72) Inventors: Donna K. Byron, Petersham, MA (US); Scott H. Isensee, Austin, TX (US); Ashok Kumar, North Chelmsford, MA (US); Mark Marrara, Round Rock, TX (US); Mary D. Swift, Rochester, NY (US); Cale R. Vardy, East York (CA)

(73) Assignee: International Business Machines Corporation, Armonk, NY (US)

( * ) Notice: Subject to any disclaimer, the term of this patent is extended or adjusted under 35 U.S.C. 154(b) by 270 days.

This patent is subject to a terminal disclaimer.

(21) Appl. No.: 16/038,153

(22) Filed: Jul. 17, 2018

(65) Prior Publication Data

US 2018/0341699 A1 Nov. 29, 2018

Related U.S. Application Data

(63) Continuation of application No. 14/722,830, filed on May 27, 2015, now Pat. No. 10,102,275.

(51) Int. Cl.
*G06F 16/33* (2019.01)
*G06F 16/332* (2019.01)
(Continued)

(52) U.S. Cl.
CPC ...... *G06F 16/3344* (2019.01); *G06F 16/3329* (2019.01); *G06F 40/247* (2020.01);
(Continued)

(58) Field of Classification Search
CPC ............. G06F 16/3329; G06F 16/3344; G06F 16/24522; G06F 16/288; G06F 16/90332;
(Continued)

(56) References Cited

U.S. PATENT DOCUMENTS

| 5,386,556 A | 1/1995 | Hedin |
| 6,076,088 A | 6/2000 | Paik |

(Continued)

FOREIGN PATENT DOCUMENTS

| EP | 1852811 A3 | 2/2008 |
| WO | 2013125286 A1 | 8/2013 |

OTHER PUBLICATIONS

Eduardo Blanco and Dan Moldovan, Jun. 2011, "Semantic Representation of Negation Using Focus Detection", Proceedings of the 49th Annual Meeting of the Association for Computations Linguistics 2011, pp. 581-589.

(Continued)

*Primary Examiner* — Dangelino N Gortayo
(74) *Attorney, Agent, or Firm* — Aaron N. Pontikos; William H. Hartwell

(57) ABSTRACT

A method, system or computer usable program product for utilizing a dialectical model for providing an answer to a user query including applying NLP to the query to generate a first set of NLP structures; generating a contrary set of NLP structures contrary to the user query; evaluating the first set of NLP structures to identify a first set of evidence; evaluating the contrary set of NLP structures to identify a second set of evidence; evaluating a first set of hypotheses from the first set of NLP structures and a contrary set of hypotheses from the contrary set of NLP structures to determine a set of answers to the user query; summarizing the set of answers including indicating derivation thereof; and providing the summarized set of answers to the user.

18 Claims, 9 Drawing Sheets

(51) Int. Cl.
  *G06F 16/35* (2019.01)
  *G06F 16/9535* (2019.01)
  *G06F 16/2452* (2019.01)
  *G06F 40/247* (2020.01)

(52) U.S. Cl.
  CPC ........ *G06F 16/24522* (2019.01); *G06F 16/35* (2019.01); *G06F 16/9535* (2019.01)

(58) Field of Classification Search
  CPC ... G06F 16/9535; G06F 40/20; G06F 16/3338
  USPC .......................... 707/708, 728, 760, 711, 739
  See application file for complete search history.

(56) References Cited

U.S. PATENT DOCUMENTS

| | | | |
|---|---|---|---|
| 6,105,023 | A | 8/2000 | Callan |
| 6,766,320 | B1 | 7/2004 | Wang |
| 6,807,548 | B1 | 10/2004 | Kemper |
| 7,283,951 | B2 | 10/2007 | Marchisio |
| 7,313,515 | B2 | 12/2007 | Crouch |
| 7,324,936 | B2 | 1/2008 | Saldanha |
| 7,349,899 | B2 | 3/2008 | Namba |
| 7,428,541 | B2 | 9/2008 | Houle |
| 7,461,047 | B2 | 12/2008 | Masuichi et al. |
| 7,555,475 | B2 | 6/2009 | Quiroga |
| 7,689,557 | B2 | 3/2010 | Pandit |
| 7,831,585 | B2 | 11/2010 | Ramsey et al. |
| 8,051,088 | B1 | 11/2011 | Tibbetts |
| 8,051,408 | B1 | 11/2011 | Johnson |
| 8,219,599 | B2 | 7/2012 | Tunstall-Pedoe |
| 8,370,275 | B2 | 2/2013 | Bhattacharya |
| 8,380,743 | B2 | 2/2013 | Convertino |
| 8,396,850 | B2 | 3/2013 | Schneider |
| 8,560,300 | B2 | 10/2013 | Ferrucci |
| 8,656,286 | B2 | 2/2014 | Convertino |
| 8,838,633 | B2 | 9/2014 | Dhillon et al. |
| 8,838,659 | B2 * | 9/2014 | Tunstall-Pedoe ........ G06N 5/02 707/899 |
| 9,015,098 | B1 | 4/2015 | Crosley |
| 9,317,810 | B2 | 4/2016 | Rigdon |
| 9,472,115 | B2 | 10/2016 | Adderly |
| 9,558,265 | B1 | 1/2017 | Tacchi |
| 9,710,544 | B1 | 7/2017 | Smith |
| 9,710,545 | B2 * | 7/2017 | Mo ..................... G06F 16/3344 |
| 9,727,552 | B2 | 8/2017 | Byron |
| 9,830,556 | B2 * | 11/2017 | Maarek ............... G06F 16/3323 |
| 9,842,161 | B2 | 12/2017 | Byron |
| 10,013,450 | B2 | 7/2018 | Clark |
| 10,102,275 | B2 | 10/2018 | Byron |
| 10,146,858 | B2 | 12/2018 | Byron |
| 10,157,174 | B2 | 12/2018 | Byron |
| 10,176,250 | B2 | 1/2019 | Byron |
| 10,366,116 | B2 | 7/2019 | Byron |
| 2002/0046019 | A1 | 4/2002 | Verhagen |
| 2002/0127521 | A1 | 9/2002 | Fegan |
| 2002/0128818 | A1 | 9/2002 | Ho |
| 2003/0125929 | A1 | 7/2003 | Bergstraesser |
| 2004/0139067 | A1 | 7/2004 | Houle |
| 2004/0199374 | A1 | 10/2004 | Wang |
| 2005/0108630 | A1 | 5/2005 | Wasson |
| 2005/0131874 | A1 | 6/2005 | Verbitsky |
| 2006/0047691 | A1 | 3/2006 | Humphreys |
| 2007/0033165 | A1 | 2/2007 | Sheinwald |
| 2008/0235199 | A1 | 9/2008 | Li |
| 2008/0270120 | A1 | 10/2008 | Pestian |
| 2009/0106224 | A1 * | 4/2009 | Roulland ............ G06F 16/3325 |
| 2009/0226872 | A1 | 9/2009 | Gunther |
| 2010/0024030 | A1 | 1/2010 | Meijer |
| 2010/0241766 | A1 | 9/2010 | Bruno |
| 2011/0004632 | A1 | 1/2011 | Martino |
| 2011/0218822 | A1 | 9/2011 | Buisman |
| 2012/0011428 | A1 | 1/2012 | Chisholm |
| 2013/0066886 | A1 | 3/2013 | Bagchi |
| 2013/0073388 | A1 | 3/2013 | Heath |
| 2013/0138425 | A1 | 5/2013 | Luke |
| 2014/0006012 | A1 | 1/2014 | Zhou |
| 2014/0006557 | A1 | 1/2014 | Lindgren |
| 2014/0046947 | A1 | 2/2014 | Jenkins |
| 2014/0120513 | A1 | 5/2014 | Jenkins |
| 2014/0163962 | A1 | 6/2014 | Castelli |
| 2014/0172139 | A1 | 6/2014 | Clark |
| 2014/0172756 | A1 | 6/2014 | Clark |
| 2014/0172878 | A1 | 6/2014 | Clark |
| 2014/0172880 | A1 | 6/2014 | Clark |
| 2014/0172882 | A1 | 6/2014 | Clark |
| 2014/0172883 | A1 | 6/2014 | Clark |
| 2014/0195884 | A1 | 7/2014 | Castelli |
| 2014/0278448 | A1 | 9/2014 | Sadeghi |
| 2014/0280256 | A1 | 9/2014 | Wolfram |
| 2014/0365502 | A1 | 12/2014 | Haggar |
| 2015/0026106 | A1 | 1/2015 | Oh |
| 2015/0066479 | A1 * | 3/2015 | Pasupalak ........... G06F 16/9535 704/9 |
| 2015/0142418 | A1 | 5/2015 | Byron |
| 2015/0286977 | A1 | 10/2015 | Schneeman |
| 2015/0324350 | A1 | 11/2015 | Bufe, III |
| 2016/0041986 | A1 * | 2/2016 | Nguyen ................ G06Q 50/01 707/711 |
| 2016/0085853 | A1 | 3/2016 | Zelevinsky |
| 2016/0140445 | A1 | 5/2016 | Adderly |
| 2016/0147763 | A1 | 5/2016 | Kalyanpur |
| 2016/0147871 | A1 | 5/2016 | Kalyanpur |
| 2016/0148114 | A1 | 5/2016 | Allen |
| 2016/0171119 | A1 | 6/2016 | Bufe |
| 2016/0203130 | A1 | 7/2016 | Roque |
| 2016/0239562 | A1 | 8/2016 | Schilder |
| 2016/0246779 | A1 | 8/2016 | Ho |
| 2016/0247087 | A1 | 8/2016 | Nassar |
| 2016/0328386 | A1 | 11/2016 | Cross, III |
| 2016/0350279 | A1 | 12/2016 | Byron |
| 2017/0052967 | A1 | 2/2017 | Castillo |
| 2017/0161311 | A1 | 6/2017 | Clark |
| 2017/0169017 | A1 | 6/2017 | Byron |
| 2017/0177675 | A1 | 6/2017 | Beller |
| 2017/0193174 | A1 | 7/2017 | Allen |
| 2017/0199882 | A1 | 7/2017 | Byron |
| 2017/0199929 | A1 | 7/2017 | Byron |
| 2018/0001470 | A1 | 1/2018 | Rusu |
| 2018/0067950 | A1 | 3/2018 | Byron |
| 2018/0260860 | A1 | 9/2018 | Devanathan |
| 2019/0236088 | A1 | 8/2019 | Byron |

OTHER PUBLICATIONS

Albert Gatt and Ehud Reiter, Mar. 2009, "SimpleNLG: A realisation engine for practical applications", Proceedings of the 12th European Workshop on Natural Language Generation, Association for Computational Linguistics 2009, pp. 90-93.

D.C. Gondek et al, May/Jul. 2012, "A framework for merging and ranking of answers in DeepQA", IBM Journal of Research and Development, vol. 56, No. 3/4, Paper 14.

H. Harkema et al, 2009, "ConText: An algorithm for determining negation, experiencer, and temporal status from clinical reports", Journal of Biomedical Informatics (2009), vol. 42, pp. 839-851.

Marie-Catherine de Marneffe et al, 2008, "Finding Contradictions in Text", Proceedings of ACL 2008, pp. 1039-1047.

Roser Morante and Caroline Sporleder (eds.), Jul. 2010, Proceedings of the workshop on Negation and Speculation in Natural Language Processing (NeSp-NLP 2010).

V. Vincze et al, 2008, "The BioScope corpus: biomedical texts annotated for uncertainty, negation and their scopes", BMC Bioinformatics 2008, 9(Suppl 11): S9.

T. Wilson et al, 2009, "Recognizing Contextual Polarity: An exploration of features for phrase-level sentiment analysis", Association for Computational Linguistics, vol. 35, No. 3, pp. 399-433.

Gene Ontology Annotation (UniProt-GOA) database, May 16 2012, found on the world wide web at: https://web.archive.org/web/20120516002544/http://www.ebi.ac.uk/GOA/.

Yuan et al, "Watson and Healthcare", 2011, IBM developerWorks.

(56) References Cited

OTHER PUBLICATIONS

Rob High, "The Era of Cognitive Systems: An Inside Look at IBM Watson and How it Works", 2012, IBM Redbooks.

"List of IBM Patents or Patent Applications Treated as Related", including U.S. Pat. No. 9,727,552 B2, filed May 27, 2016, entitled "Utilizing a Dialectical Model in a Questions Answering System".

Varis et al., "Win Merge 2.14 Help", Thingamahoochie Software, Revision 1.5.13, Copyright 2004-2013, 199 pages.

Budnik, Tom, et al.; "High Throughput Computing on IBM's Blue Gene/P", 20 pages.

Byron et al., "Automated Curation of Documents in a Corpus for a Cognitive Computing System", U.S. Appl. No. 16/212,924, 50 pages.

Byron et al., "Discrepancy Handler for Document Ingestion Into a Corpus for a Cognitive Computing System", U.S. Appl. No. 16/162,193, filed Oct. 16, 2018, 49 pages.

Ferrucci, D. A., et al.;"This is Watson", IBM Journal of Research and Development, vol. 56, No. 3/4, May/Jul. 2012, 208 pages.

Ferrucci, David, et al.; "The AI Behind Watson—The Technical Article"; 2010, retrieved on Nov. 12, 2015 from http://www.aaai.org/Magazine/Watson/watson.php, 26 pages.

IBM, "List of IBM Patents or Patent Applications Treated As Related", Appendix P, 2 pages, dated Jul. 31, 2020.

IBM; "Watson—A System Designed for Answers", Feb. 2011, 6 pages.

Kelley III, John E. Dr.; "Computing, cognition and the future of knowing", Copyright 2015 by IBM Corporation, 12 pages.

Stack Overflow, "What is the TREC format?"; retrieved on Feb. 7, 2017 from http://www.stackoverflow.com, 2 pages.

Stack Overflow, "Where does one find the TREC Document format specification?", retrieved on Feb. 7, 2017 from http://www_stackoverflow_com, 1 page.

Temperley, Davy, et al.; "Link Grammar", retrieved on Nov. 30, 2015 from http://www.link.cs.cmu.edu/link/, 1 page.

The Lemur Project, "Indexer File Formats", as archived by https://web.acrhive.org on Jul. 27, 2014, available at https://web_archive.org/web/20140727233009/http://sourceforge_net/p/lemur/wiki/Indexer%20File%20Formats/, 2 pages.

Wikipedia, "Text Retrieval Conference", as archived by https:/web.acrhive.org on Nov. 9, 2015, and annotated by the source as having been last modified on Jun. 13, 2015, 5 pages.

\* cited by examiner

FIG. 5

| User Query: | When is the best time to visit Japan? _510_ | |
|---|---|---|
| Variations _520_ | | Negated Variations _530_ |
| 1) When is the best time of the year to visit Japan? _522_<br>☐ Delete  ☐ Modify | | 1) When is the worst time to visit Japan? _532_<br>☐ Delete  ☐ Modify |
| 2) What is the best day of the week to visit Japan? _524_<br>☐ Delete  ☐ Modify | | 2) What is the worst time of the year to visit Japan?<br>☐ Delete  ☐ Modify _534_ |
| 3) When is the best time of the year to tour Japan? _526_<br>☐ Delete  ☐ Modify | | 3) When is the worst time of the year to tour Japan?<br>☐ Delete  ☐ Modify _536_ |

500

USER INTERFACE FOR A QUERY ANSWERING SYSTEM

This application is a continuation of application Ser. No. 14/722,830 filed May 27, 2015 entitled "USER INTERFACE FOR A QUERY ANSWERING SYSTEM", the disclosure of which is incorporated in its entirety herein by reference.

BACKGROUND

1. Technical Field

The present invention relates generally to a user interface for an information retrieval system, and in particular, to a computer implemented method for a user interface to augment a query answering system.

2. Description of Related Art

An information retrieval system can be organized into a question/query and answer generation system (QA system) where the user provides a question or query and the system provides an answer based on a corpus of data. The corpus of data may be predefined or may be open ended such as the internet. An input question or query may be analyzed using natural language processing or other techniques to extract the major features of the question. The question analysis could be closed domain (e.g. limited to the medical field) or open domain. A corpus of data can then be analyzed to identify possible sources for a response to the question. Those sources may be analyzed to derive an answer to the input question. The answer is then provided to the user.

SUMMARY

The illustrative embodiments provide a method, system, and computer usable program product for utilizing a dialectical model for providing an answer to a user query including applying NLP to the query to generate a first set of NLP structures; generating a contrary set of NLP structures contrary to the user query; evaluating the first set of NLP structures to identify a first set of evidence; evaluating the contrary set of NLP structures to identify a second set of evidence; evaluating a first set of hypotheses from the first set of NLP structures and a contrary set of hypotheses from the contrary set of NLP structures to determine a set of answers to the user query; summarizing the set of answers including indicating derivation thereof; and providing the summarized set of answers to the user.

BRIEF DESCRIPTION OF THE SEVERAL VIEWS OF THE DRAWINGS

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

FIG. 5 is an illustration of a user interface for reviewing user query variations in which various embodiments may be implemented;

DETAILED DESCRIPTION

Processes and devices may be implemented utilizing a user interface to augment a query answering system. These processes and apparatuses may be implemented and utilized as will be explained with reference to the various embodiments below.

Figure 1:
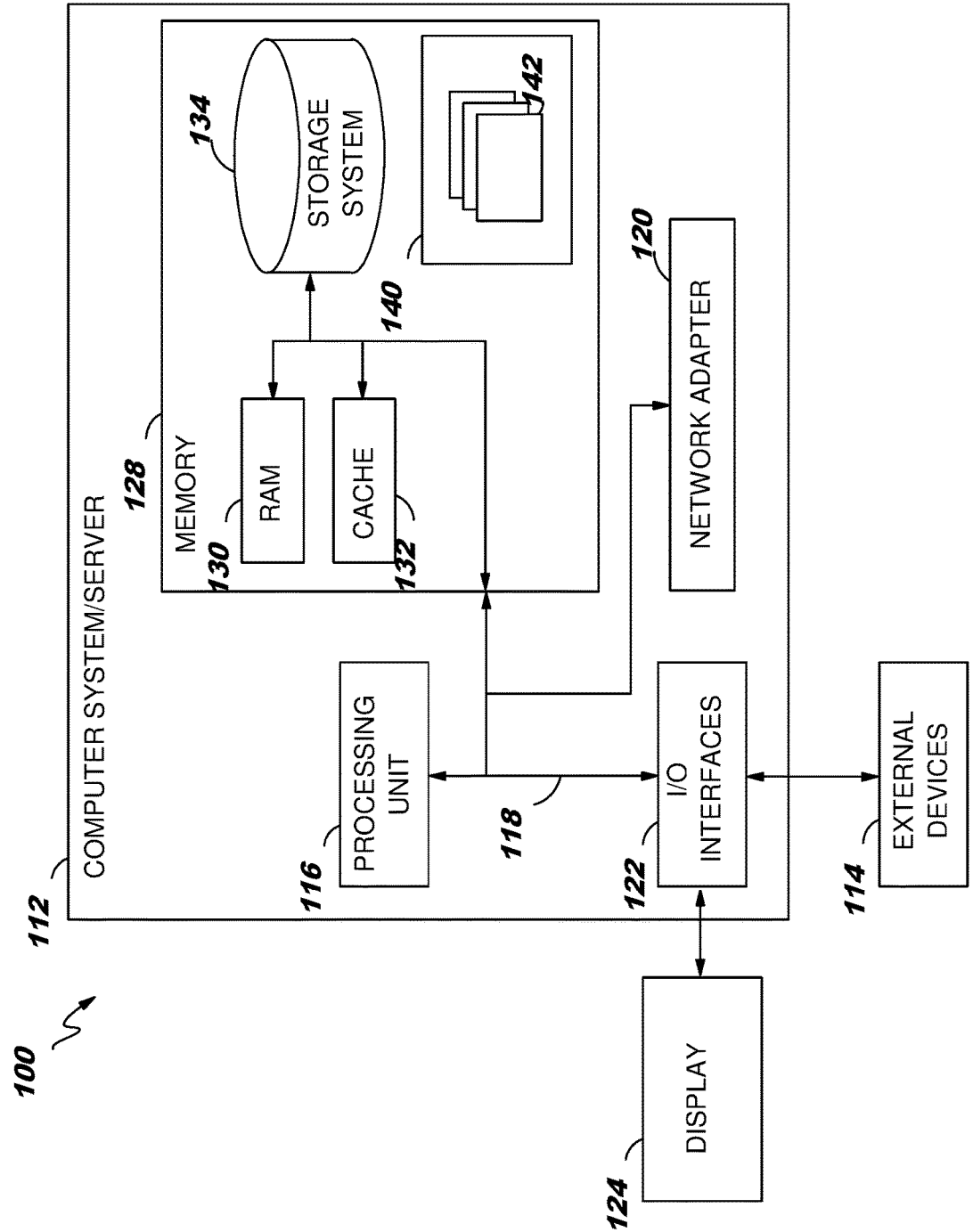
FIG. 1 is a block diagram of an illustrative data processing system in which various embodiments of the present disclosure may be implemented.

FIG. 1 is a block diagram of an illustrative data processing system in which various embodiments of the present disclosure may be implemented. Data processing system 100 is one example of a suitable data processing system and is not intended to suggest any limitation as to the scope of use or functionality of the embodiments described herein. Regardless, data processing system 100 is capable of being implemented and/or performing any of the functionality set forth herein such as utilizing a user interface to augment a query answering system.

In data processing system 100 there is a computer system/server 112, which is operational with numerous other general purpose or special purpose computing system environments, peripherals, or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 112 in data processing system 100 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of non-transitory computer system usable media. Such media may be any available media that is accessible by computer system/server 112, and it includes both volatile and non-volatile media, removable and non-removable media.

System memory 128 can include non-transitory computer system readable media in the form of volatile memory, such as random access memory (RAM) 130 and/or cache memory 132. Computer system/server 112 may further include other non-transitory removable/non-removable, volatile/non-volatile computer system storage media. By way of example, storage system 134 can be provided for reading from and writing to a non-removable, non-volatile magnetic media (not shown and typically called a "hard drive"). Although not shown, a USB interface for reading from and writing to a removable, non-volatile magnetic chip (e.g., a "flash drive"), and an optical disk drive for reading from or writing to a removable, non-volatile optical disk such as a CD-ROM, DVD-ROM or other optical media can be provided. In such instances, each can be connected to bus 118 by one or more data media interfaces. Memory 128 may include at least one program product having a set (e.g., at least one) of program modules that are configured to carry out the functions of the embodiments. Memory 128 may also include data that will be processed by a program product.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of the embodiments. For example, a program module may be software for utilizing a user interface to augment a query answering system.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122 through wired connections or wireless connections. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, tape drives, RAID systems, redundant processing units, data archival storage systems, external disk drive arrays, etc.

Figure 2:
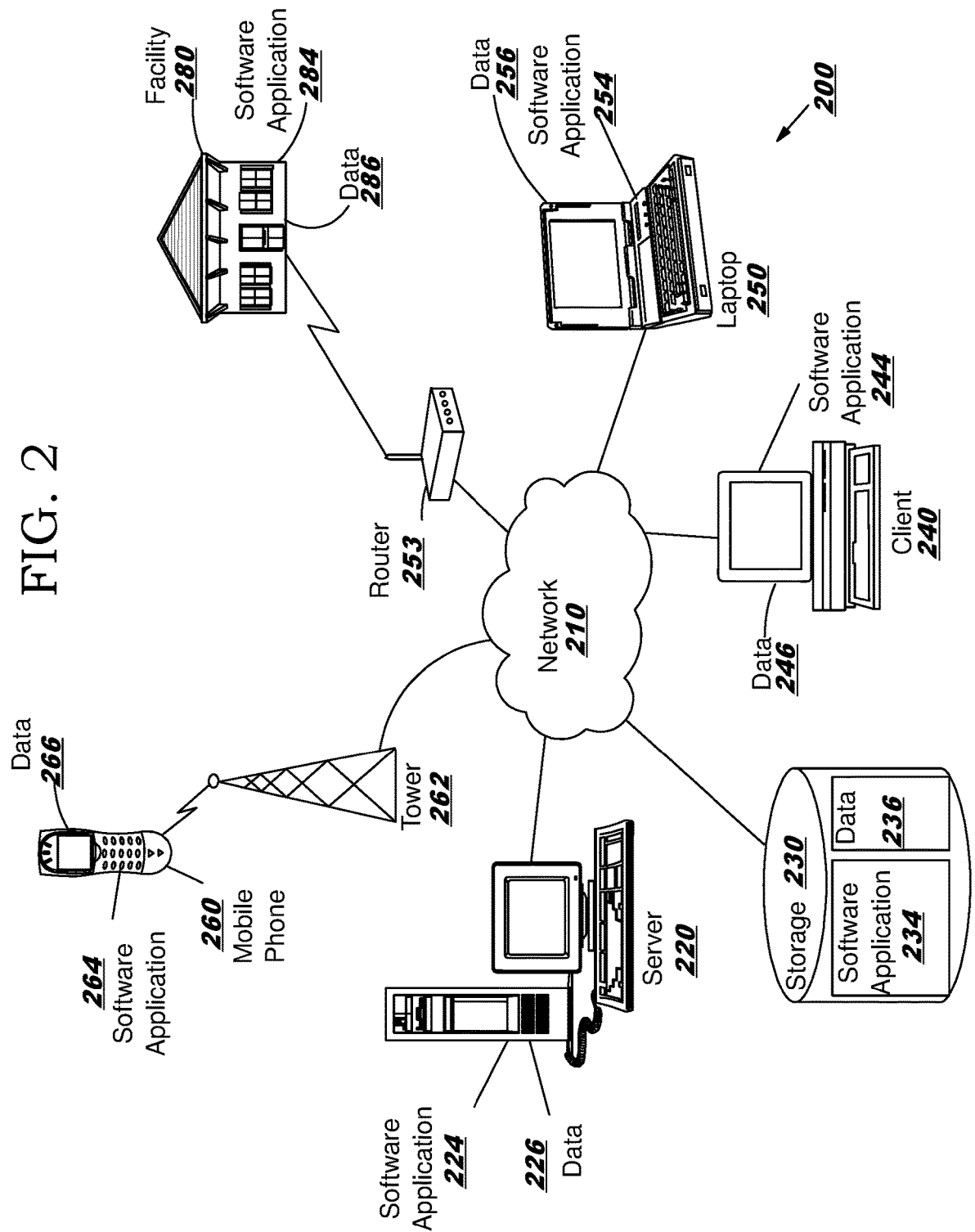
FIG. 2 is a block diagram of an illustrative network of data processing systems in which various embodiments of the present disclosure may be implemented.

FIG. 2 is a block diagram of an illustrative network of data processing systems in which various embodiments of the present disclosure may be implemented. Data processing environment 200 is a network of data processing systems such as described above with reference to FIG. 1. Software applications such as for utilizing a user interface to augment a query answering system may execute on any computer or other type of data processing system in data processing environment 200. Data processing environment 200 includes network 210. Network 210 is the medium used to provide simplex, half duplex and/or full duplex communications links between various devices and computers connected together within data processing environment 200. Network 210 may include connections such as wire, wireless communication links, or fiber optic cables.

Server 220 and client 240 are coupled to network 210 along with storage unit 230. In addition, laptop 250 and facility 280 (such as a home or business) are coupled to network 210 including wirelessly such as through a network router 253. A mobile phone 260 may be coupled to network 210 through a mobile phone tower 262. Data processing systems, such as server 220, client 240, laptop 250, mobile phone 260 and facility 280 contain data and have software applications including software tools executing thereon. Other types of data processing systems such as personal digital assistants (PDAs), smartphones, tablets and netbooks may be coupled to network 210.

Server 220 may include software application 224 and data 226 for utilizing a user interface to augment a query answering system or other software applications and data in accordance with embodiments described herein. Storage 230 may contain software application 234 and a content source such as data 236 for utilizing a user interface to augment a query answering system. Other software and content may be stored on storage 230 for sharing among various computer or other data processing devices. Client 240 may include software application 244 and data 246. Laptop 250 and mobile phone 260 may also include software applications 254 and 264 and data 256 and 266. Facility 280 may include software applications 284 and data 286. Other types of data processing systems coupled to network 210 may also include software applications. Software applications could include a web browser, email, or other software application for utilizing a user interface to augment a query answering system.

Server 220, storage unit 230, client 240, laptop 250, mobile phone 260, and facility 280 and other data processing devices may couple to network 210 using wired connections, wireless communication protocols, or other suitable data connectivity. Client 240 may be, for example, a personal computer or a network computer.

In the depicted example, server 220 may provide data, such as boot files, operating system images, and applications to client 240 and laptop 250. Server 220 may be a single computer system or a set of multiple computer systems working together to provide services in a client server environment. Client 240 and laptop 250 may be clients to server 220 in this example. Client 240, laptop 250, mobile phone 260 and facility 280 or some combination thereof, may include their own data, boot files, operating system images, and applications. Data processing environment 200 may include additional servers, clients, and other devices that are not shown.

In the depicted example, data processing environment 200 may be the Internet. Network 210 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 200 also may be implemented as a number of different types of networks, such as for example, an intranet, a local area network (LAN), or a wide area network (WAN). FIG. 2 is intended as an example, and not as an architectural limitation for the different illustrative embodiments.

Among other uses, data processing environment 200 may be used for implementing a client server environment in which the embodiments may be implemented. A client server environment enables software applications and data to be distributed across a network such that an application functions by using the interactivity between a client data processing system and a server data processing system. Data processing environment 200 may also employ a service oriented architecture where interoperable software components distributed across a network may be packaged together as coherent business applications.

Figure 3:
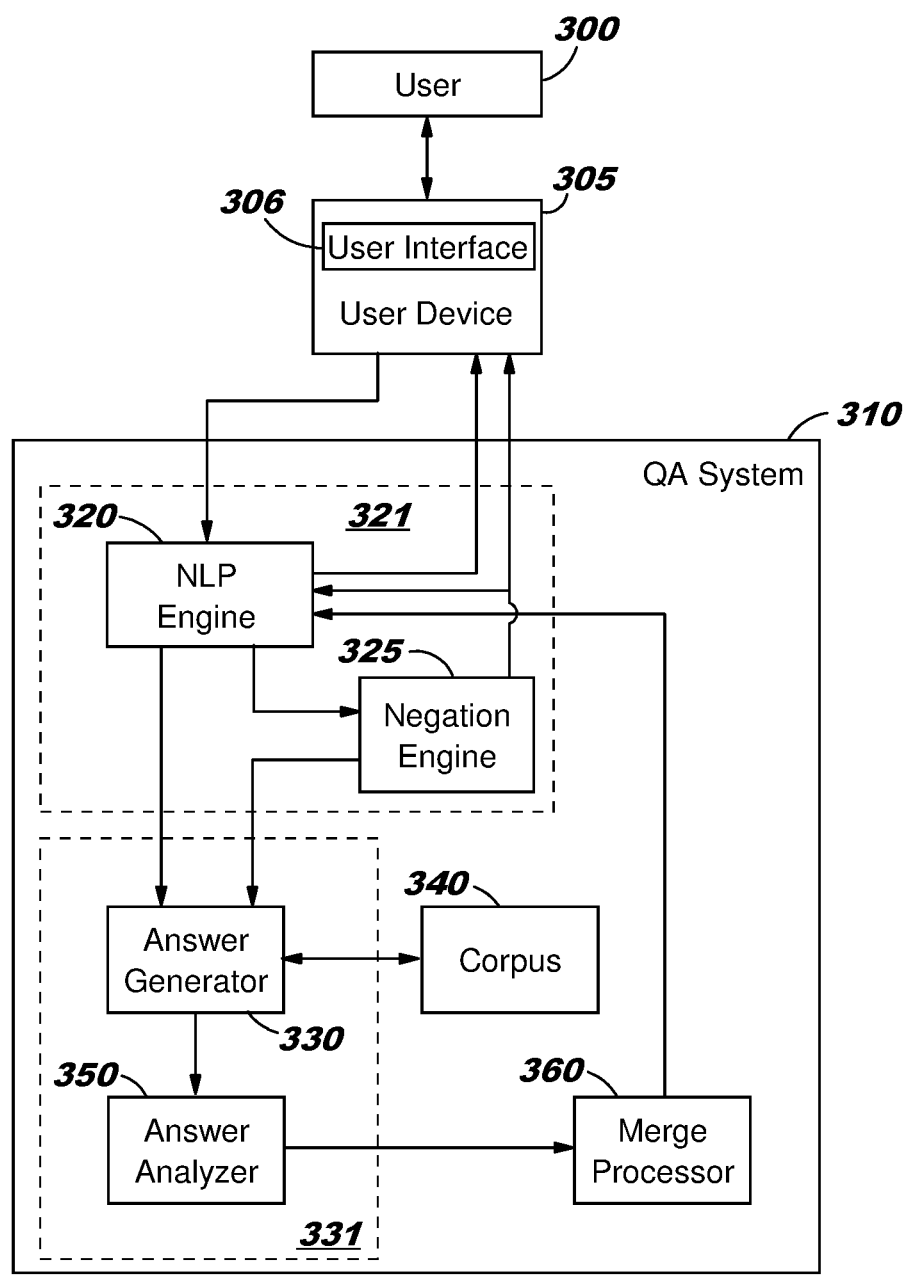
FIG. 3 is a block diagram of a query answering machine utilizing a user interface in which various embodiments may be implemented.

FIG. 3 is a high level block diagram of a query answering machine utilizing a user interface in which various embodiments may be implemented. A user 300 may be utilizing a user device 305 to provide a natural language question to a question (or query) answering (QA) system 310 to obtain an answer to the user question or other type of query. For example, the user query may be a declarative statement and the QA system is expected to verify that declarative statement by treating it as a query. For another example, the user query may be in the form of an answer and the QA system generates a question to which the answer answers. Also, the answers to the queries may be a single best (most confident) answer, a set of best answers (e.g., top 5), or even a pro and con sets of answers. Other types of queries and answers may be utilized and may be managed through the use of user preferences, prior instructions, etc. User 300 may be utilizing a mobile device, such as a mobile phone, tablet, or laptop, or a non-mobile device such as a desktop computer or a server station. User device 305 can include a user interface 306 or other type of application to interface with the user. User interface 306 may include speech recognition technology or other technology to enhance user input and output to the user. User interface may also be utilized as described below to obtain user input to the query answering process, thereby utilizing human input in that process to improve the resulting answers and to train or otherwise improve the underlying query answering system. QA system 310 may be located on the user device, or on a nearby or remote system such as a server or across multiple servers such as a cloud implementation. Communication between user device 305 and QA system 310 may be established across a network or the interne.

Question (or query) answering (QA) system 310 includes a natural language processing (NLP) engine 320, a negation engine 325, an answer generator 330, a corpus 340, an answer analyzer 350 and a merge processor 360. NLP engine 320 is utilized to derive meaning from natural language. That is, a user provided natural language question or other type of query is analyzed by NLP engine 320 by parsing, syntactical analysis, morphological analysis, and other processes including statistical modeling and statistical analysis. The type of NLP analysis can vary by language and other considerations. The NLP engine analysis is utilized to generate a first set of NLP structures which can be utilized by a computer to identify and generate potential answers to that query. These NLP structures include a translation and/or interpretation of the user query, including synonymous variants thereof. NLP engine 320 can also be utilized for answer generator 330 to convert information from computer databases or other corpus 340 into natural language.

NLP engine utilizes negation engine 325 to generate a contrary or otherwise opposing second set of NLP structures which represent an opposite polarity query to the user query, including synonymous variations thereof. Having an opposing second set of NLP structures for searching increases the breadth of a search for answers as well as provides an additional perspective for finding an answer based on that search, thereby potentially improving the likelihood of finding a correct answer for the underlying query. This approach can be referred to as answer summation. The type of opposite polarity query represented by the second set of NLP structures can vary depending on the type of user query provided. For example, a superlative style question (e.g., "What is the best . . . ") may be negated with an opposing superlative style question (e.g., "What is the worst . . . " or "What is the least . . . "). The NLP structures from both the NLP engine and the negation engine are passed to answer generator 330.

NLP engine 320 and negation engine 325 may be separate structures or programs where NLP engine 320 processes the natural language from the user and then passes the resulting NLP structures to negation engine 325 for negation. However, NLP engine 320 and negation engine 325 may be tightly coupled or otherwise grouped as a common structure or program as NLP engine 321. Also, NLP engine 320 and negation engine 321 may both process the natural language from the user in parallel. That is, the NLP engine can process the natural language query to generate a set of NLP structures representing the user query and the negation engine can also process the natural language query to generate a set of negated NLP structures representing a negation of the user query, in parallel or in series. Many other types of alternative structures can be utilized.

The many variations (negations and synonyms) of the user query generated by the NLP engine 320 and negation engine 325 are translated back to natural language and presented to the user in this embodiment. The user is then given the capability to modify or delete any of those variations. That is, the user is given the capability to modify or remove any query variations that the user determines differ from his or her original question or its negation. For example, the user query may be "Where is the sky most blue?". A negation variation may be "Where is the sky red?". The user may recognize that this could generate many answers regarding the color of the sky on Mars. As a result, the user can remove this line of query, modify the queries, or go back and rephrase the original query to "Where is the sky most blue on Earth?". In some embodiments, the user may be limited to deleting or otherwise removing selected query variations. This helps direct the processing of the elements described below and reduces the number of answers that might be unrelated to the original user query.

Answer generator 330 is a search engine for obtaining possible answers to the user query from a corpus 340. Answer generator 330 utilizes NLP structures (i.e., the first set derived from the user query and the second set representing an opposite polarity query, and including synonymous variations of both) to identify and obtain these possible answers from corpus 340. Answer generator can include multiple processors or software threads (i.e., engines) working in parallel with each engine handling a set of NLP structures or individual NLP structures such as one variant of the user query or negation thereof. Corpus 340 is an information database or answer source knowledge database containing sources of both structured and unstructured information which can contain possible answers to the user query. Corpus 340 can include documents, typed lists, web pages and other sources of information. These sources may be in raw form or are preferably derived from raw sources. That is, raw sources of information, such as found on the internet, may be crawled by search engines to generate work use lists with links and other information for generating a corpus that is easier for the answer generator to search. The source of each answer is retained for use by answer analyzer 350 as described below.

Answer analyzer 350 analyzes the sources of information generated by the answer generator and the use of search terms or other information contained in the sources of information. This analysis is utilized to provide weights for each of those sources of information for each of the first set of NLP structures representing the user query and for each the second set of NLP structures representing the opposite polarity query. This weighting is performed on each source of information for the NLP structures of the user query and of the NLP structures representing the opposite polarity query. This weighting can include several factors such as the type of source (e.g., an academic article or medical journal may have greater weight, a magazine article may have lower weight), analysis of the text of each source of information for strengthening or weakening language in relation with any search terms or keywords (e.g., "can" will have a greater weight than "may", "will" will have a greater weight than "should", "verified" will have a greater weight than "unverified"), as well as analysis of potentially contradictory statements such as if then statements. Each source of information is then given an overall weight for the NLP structures of the user query and its opposite polarity based on these factors. As a result, each source of information may have two (or more) weights, one for the NLP structures of the user query (or every variation thereof) and one for the NLP structures representing the opposite polarity query (or every variation thereof). Answer analyzer can include multiple processors or software threads (i.e., engines) working in parallel with each engine handling a set of NLP structures such as one variant of the user query or negation thereof. Answer generator and answer analyzer can be tightly coupled common structure or program as answer engine 331, such as with one answer generator engine for each answer analyzer engine, or other alternative configurations.

Merge processor 360 then merges all the sources of information and their weights to rank the results based on the evidence provided and machine learning to generate a set of statistically most confident answer(s) to the user query based on the analysis described above. As described earlier, the answer(s) may be a single answer, a set of answers, a set of pro and con answers, etc. This merge process includes using the first and second sets of NLP structures to help provide the statistically most confident answer(s). That is, if the user query has a low confidence answer, but the opposite polarity query has a high confidence answer, then the answer to the opposite polarity answer may be the statistically most confident answer. For example, if the user query is "Is John Doe a citizen of the United States?" and the opposite polarity query is "Is John a citizen of another country besides the United States", then there may be weak evidence of John Doe being a citizen of the United States, but stronger evidence to the opposite polarity query that John Doe is a citizen of Australia. The answer may then become "No, John Doe is a citizen of Australia". Merge processor 360 can then utilize NLP engine 320 to generate the answer in natural language form for feedback to the user.

One example of a question (or query) and answer (QA) system which may be used in conjunction with the principles described herein is described in U.S. Patent Application Publication No. 2011/0125734, which is herein incorporated by reference in its entirety. The QA system is configured with one or more a QA system pipelines that receive inputs from various sources. Each QA system pipeline has a plurality of stages for processing an input query, the corpus of data, and generating answers for the input query based on the processing of the corpus of data. For example, the QA system may receive input from a network, a corpus of electronic documents, QA system users, or other data and other possible sources of input. In one embodiment, the content creator creates content in a document of the corpus of data for use as part of a corpus of data with the QA system. QA system users may access the QA system via a network connection or an Internet connection to the network, and may input queries to the QA system that may be answered by the content in the corpus of data. The queries are typically formed using natural language. The QA system interprets the query and provides a response to the QA system user containing one or more answers to the query, e.g., in a ranked list of candidate answers.

The QA system may be the Watson™ QA system available from International Business Machines Corporation of Armonk, N.Y., which is augmented with the mechanisms of the invention described hereafter. The Watson™ QA system parses an input query to extract the major features of the query, that in turn are then used to formulate queries that are applied to the corpus of data. Based on the application of the queries to the corpus of data, a set of candidate answers to the input query, are generated by looking across the corpus of data for portions of the corpus of data that have some potential for containing a valuable response to the input query. The Watson™ QA system then performs deep analysis on the language of the input query and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input query and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input query based on the specific area of focus of that reasoning algorithm. Each resulting score is then weighted against a statistical model. The statistical model captures how well the reasoning algorithm performed at establishing the inference between two similar passages for a particular domain during the training period of the Watson™ QA system. The statistical model may then be used to summarize a level of confidence that the Watson™ QA system has regarding the evidence that the potential response, i.e. candidate answer, is inferred by the query. This process may be repeated for each of the candidate answers until the Watson™ QA system identifies candidate answers that surface as being significantly stronger than others and thus, generates a final answer, or ranked set of answers, for the input query. More information about the Watson™ QA system may be obtained, for example, from the IBM Corporation website, IBM Redbooks, and the like. For example, information about the Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Figure 4:
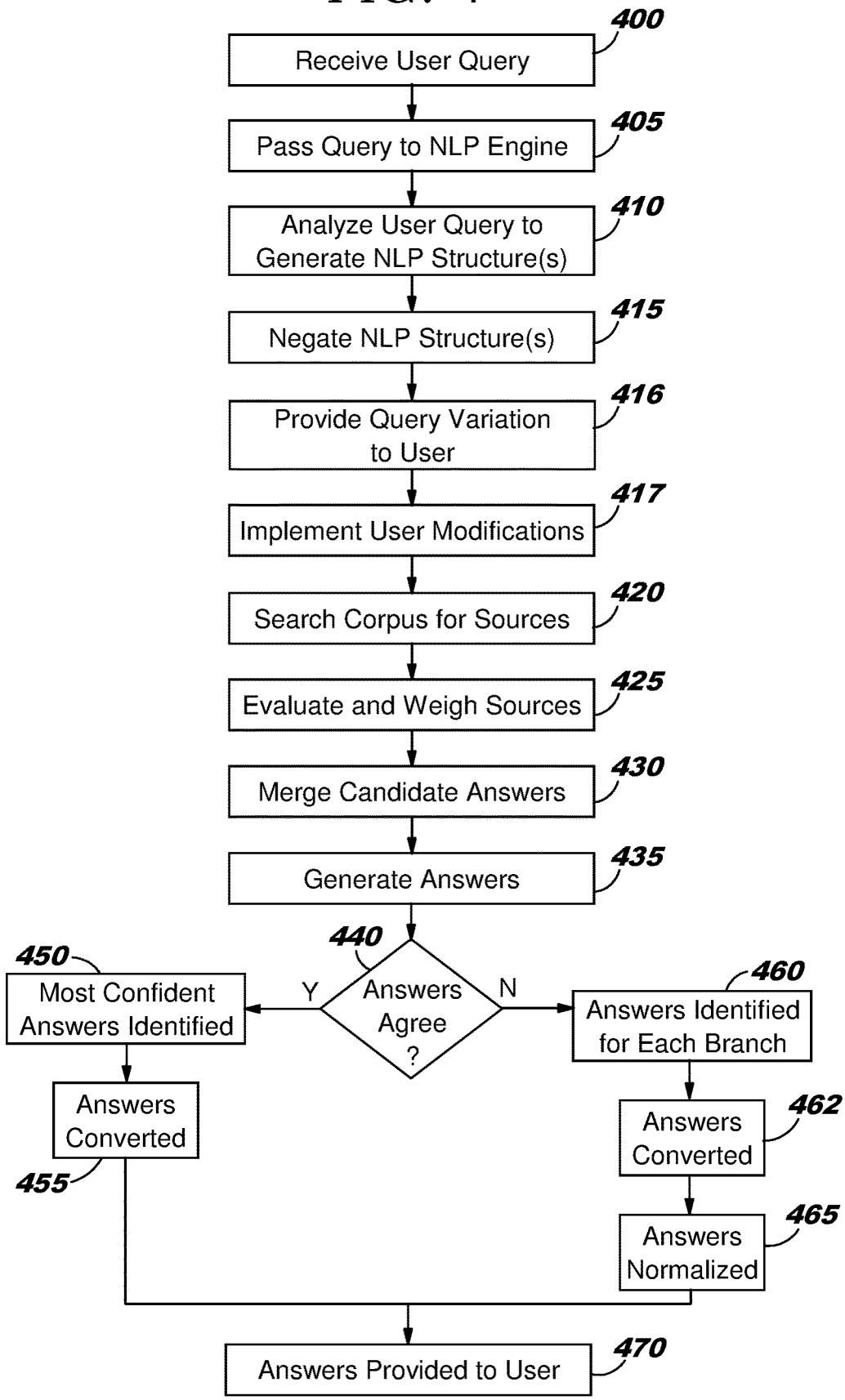
FIG. 4 is a flow diagram of a query answering machine utilizing a user interface in which various embodiments may be implemented.

FIG. 4 is a flow diagram of a query answering machine utilizing a user interface in which various embodiments may be implemented. In a first step 400, the system receives a natural language question or other type of query from a user. For example, the user query may be a declarative statement and the QA system is expected to verify that declarative statement by treating it as a query. For another example, the user query may be in the form of an answer and the QA system generates a question to which the answer answers. Also, the answers to the queries may be a single best (most confident) answer, a set of best answers (e.g., top 5), or even a pro and con sets of answers. However, the more detail shown, the more user input that may be provided in response. Other types of queries and answers may be utilized and may be managed through the use of user preferences, prior instructions, etc. This can be a natural language question or query received from the user through a user interface on a user device such as a mobile phone, tablet, or laptop, or a non-mobile device such as a desktop computer or a server station. The user interface may include speech recognition technology or other technology to enhance user input and output to the user. The user interface may be located on the user device, or on a nearby or remote system such as a server or across multiple servers such as a cloud implementation. Communication between the user device 305 and QA system 310 may be established across a network or the internet.

Then in step 405, the user interface passes the recognized natural language user query to an NLP engine for processing. Then in step 410, the NLP engine analyzes the user query by parsing, syntactical analysis, morphological analysis, and other processes including statistical modeling and statistical analysis. The NLP engine analysis is utilized to generate a first set of NLP structures, such as a first order logic structure, suitable for subsequent computer processing. These NLP structures include a translation and/or interpretation of the user query, including synonymous variants thereof. That is, the NLP structures representing or corresponding to the user query are broadened with synonymous NLP structures by broadening the queries semantically without broadening the underlying query. For example, the query "Is a daily aspirin regime good for children" can be semantically broadened to "Is a daily regime of acetylsalicylic acid good for children". Similarly, the input query "Was Mark Twain born in 1836?" can be expanded to "Was Samuel Clemens born in 1836?" This allows for more sources of information to be identified, thereby improving the possibility of providing a correct answer. The generation of synonymous NLP structures could be a separate and subsequent step to the generation of the original NLP structure representing the user query. The NLP algorithm utilized can differ based on the language of the user query, the subject matter of the user query, and other factors which could affect the analysis of the user query. Processing then continues to step 415.

Subsequently in step 415, the NLP structures corresponding to the user query are negated. That is, the first set of NLP structures representing the user query are converted into polar opposite or other type of opposing or second set of NLP structures, including synonymous variants thereof, representing a negation of the original user query. For example, if the user query is "Is a daily aspirin regime good for children", it can be converted into the set of opposing queries such as "Is a daily aspirin regime bad for children" or "Is aspirin contra-indicated for children". In another example, if the query is "Is passenger Smith a flight risk?", the opposing query "Is passenger Smith a member of TSA PRE" would be generated. Similarly, if the query is close ended but not polar, it can be converted into multiple queries. For example, if the query is "Was Mark Twain born in 1834, 1835 or 1836?" can be converted into "Was Mark Twain born in 1834?", "Was Mark Twain born in 1835?" and "Was Mark Twain born in 1836?". The generation of synonymous negated NLP structures could be a separate and subsequent step to the generation of the NLP structure representing a negation of the user query.

Alternatively, NLP engine and negation engine may both process the natural language from the user in parallel. That is, the NLP engine can process the natural language query to generate a set of NLP structures representing the user query and the negation engine can also process the natural language query to generate a set of negated NLP structures representing a negation of the user query, in parallel or in series. Many other types of alternative processes and structures can be utilized.

The in step 416, the many variations (negations and synonyms) of the user query generated in steps 410 and 415 are translated back to natural language and presented to the user in this embodiment as shown in FIG. 5 below. The user is then given the capability to modify or delete any of those variations in step 417. That is, the user is given the capability to modify or remove any query variations that the user determines differ from his or her original question or its negation. For example, the user query may be "Where is the sky most blue?". A negation variation may be "Where is the sky red?". The user may recognize that this could generate many answers regarding the color of the sky on Mars. As a result, the user can remove this line of query, modify the queries, or go back and rephrase the original query to "Where is the sky most blue on Earth?". The user deletions and modifications are implemented in the current user query answering process, but may also be utilized as feedback to train or otherwise improve the underlying query answering process. If the user changes the original query, then processing returns to step 400. In some embodiments, the user may be limited to deleting or otherwise removing selected query variations. This helps direct the processing of the steps described below and reduces the number of answers that might be unrelated to the original user query.

In step 420, the answer generator searches the corpus for sources of possible or candidate answers to each set of NLP structures or even each NLP structure. This searching process can be performed for each set of NLP structures or for each NLP structure (such as one variant of the user query or negation thereof) in series or parallel. The corpus is a set of information sources (also referred to herein as evidence) which can be searched by a search engine using the NLP structures. The corpus can be closed domain (e.g., medical) or open domain (e.g., the internet). Because the NLP structures for each user query are different, each NLP structure may be utilized generate different sources of information. By using a second set of NLP structures representing a negation of the user query, a greater set of information sources (evidence) can be identified for candidate answers.

Then in step 425, the possible sources for each NLP structure are then evaluated and weighted for each of the first set of NLP structures representing the user query and for each the second set of NLP structures representing the opposite polarity query. The possible sources for each set of NLP structures or each NLP structure may be evaluated in parallel or in series depending on the implementation. No deduplication occurs at this step in this embodiment, although alternative embodiments could perform deduplication at this step. In addition, a source of evidence identified for candidate answers for one NLP structure may also be utilized as a source for candidate answers for another or even opposing NLP structure. That is, a source of evidence identified for the first set of NLP structures can be evaluated for contradictory answers for the second set of NLP structures and vice versa. This step includes identifying the strength of each source of evidence, the strength of each candidate answer identified in the source, and for contradictory candidate answers within each source. For example, certain medical journals may be considered as reliable sources of information. The use of certain words such as "always" may be considered a stronger source than words such as "generally". Contradictory statements can include if/then statements (e.g., "if the child is not running a fever, then . . . ") and other statements indicating a contradiction (e.g., "Prior research showed that aspirin is good for children. However, such research was later shown to include researcher bias"). Processing then continues to step 430.

In step 430, the candidate answers supporting each branch of the dialectical model are then merged to generate a set of hypothesis for evaluation based on the candidate answers. Evidence merging can happen in various ways depending on the domain and use case. An example merging function may deduplicate the evidence sources that support each hypothesis within the same set (either pro or con). In another embodiment, the merging function might sum the overall number of document hits supporting each hypothesis for each dialectical branch (such as pro and con). Furthermore, evaluating the first set of hypotheses includes evaluating the first set of candidate answers supported by the first set of evidence and evaluating contradictory candidate answers supported by the second set of evidence. Also evaluating the second set of hypotheses includes evaluating the second set of candidate answers supported by the second set of answers and evaluating contradictory candidate answers supported by the first set of evidence. Then in step 435, a set of answers will be generated or otherwise provided for each hypothesis based on the compilation of evidence and candidate answers. Each answer will be provided with a confidence or other weighting of the answer for that hypothesis.

Subsequently in step 440, the answers provided for each hypothesis are compared to see if they agree. For example, if the user query is a polar question, then there will be a first hypothesis with a first answer and a second hypothesis with a second answer. In this polar question example, if the first hypothesis is true and the second hypothesis is false, then they concur. In the example of a close ended non-polar question, if one hypothesis is true and all the other hypotheses are false, then the answers agree. If so, then processing continues to step 460, otherwise processing continues to step 450.

In step 450, the most confident hypotheses are identified. These are the most confident answers with the greatest confidence, or if all hypotheses are false, the false hypotheses with the least confidence. Then in step 455, the most confident hypotheses are translated or otherwise converted into a set of answers to the user query, including the confidence levels for the answers. The NLP processor may be utilized for generating these answers. Processing then continues to step 470.

In step 460, the most confident hypotheses for each branch of the NLP structures are identified as described above in step 450. Then in step 462, the most confident answers for each branch of the NLP structures are converted into a set of answers to the user query, including the confidence in each answer. Then in step 465, the confidence in both sets of answers (to the user query and its negation) are then normalized to take into account the confidence of the other set of answers. This step may not be necessary if both sets of answers were generated together. The NLP processor may be utilized for generating this answer. Next, in step 470, the set of answers including confidence levels is converted back to natural language and provided to the user such as shown below with reference to FIG. 7. As discussed above, the types of answers and format provided may differ based on user preferences or other instructions. For example, the user may request a set of 3 most confident answers, a set of pro and con answers, answers in the form of a question, etc. Many other variations of this process can be implemented by one of ordinary skill in the art. However, the more detail shown, the more user input that may be provided in response. Further processing with user input is described below with reference to FIG. 6.

FIG. 5 is an illustration of a user interface 500 for reviewing user query variations in which various embodiments may be implemented. User interface 500 may be provided to a user on a display and includes the user query 510, a set of variations (synonyms) 520 and a set of negated variations 530 of user query 510. The variations 520 of user query 510 include variations 522, 524 and 526. The negated variations 530 of the user query (including the direct negation of user query 510) include 532, 534 and 536. The examples provided in variations 520 and negated variations 530 are for illustrative purposes only. Actual variations and negated variations may differ significantly and may be more or less numerous than shown in this illustrative example. As described above with reference to FIG. 4, a negation can be context based and not just the antonym, depending on the type of user query and variations thereof. For example, if a user asks "when is the best time to visit Japan", a negation variation could be "when is the rainy season in Japan".

The user has the option to delete a variation by checking a delete box such as box 522a or 532a. The user also has the option to modify a variation by checking a modify box such as modify box 522b or 532b, and then typing or otherwise entering an updated variation in the corresponding space such as box 522 or box 532. The user also has the option to retype or otherwise reenter (e.g., by voice command) the user query in box 510, which would restart the query answering process as described above. If a query variation is deleted, then the corresponding NLP structure is also deleted. If a query variation is modified, then the modified query is translated bask to a NLP structure to replace the NLP structure previously corresponding to that variation.

Many of types of user interfaces may be utilized to provide the user query and its variations to the user for feedback. For example, user interface 500 can include a scrolling feature so the user can scroll down to additional variations not currently shown on the display. This is an illustrative example which one of ordinary skill could modify or implement in other formats for user feedback.

Figure 6:
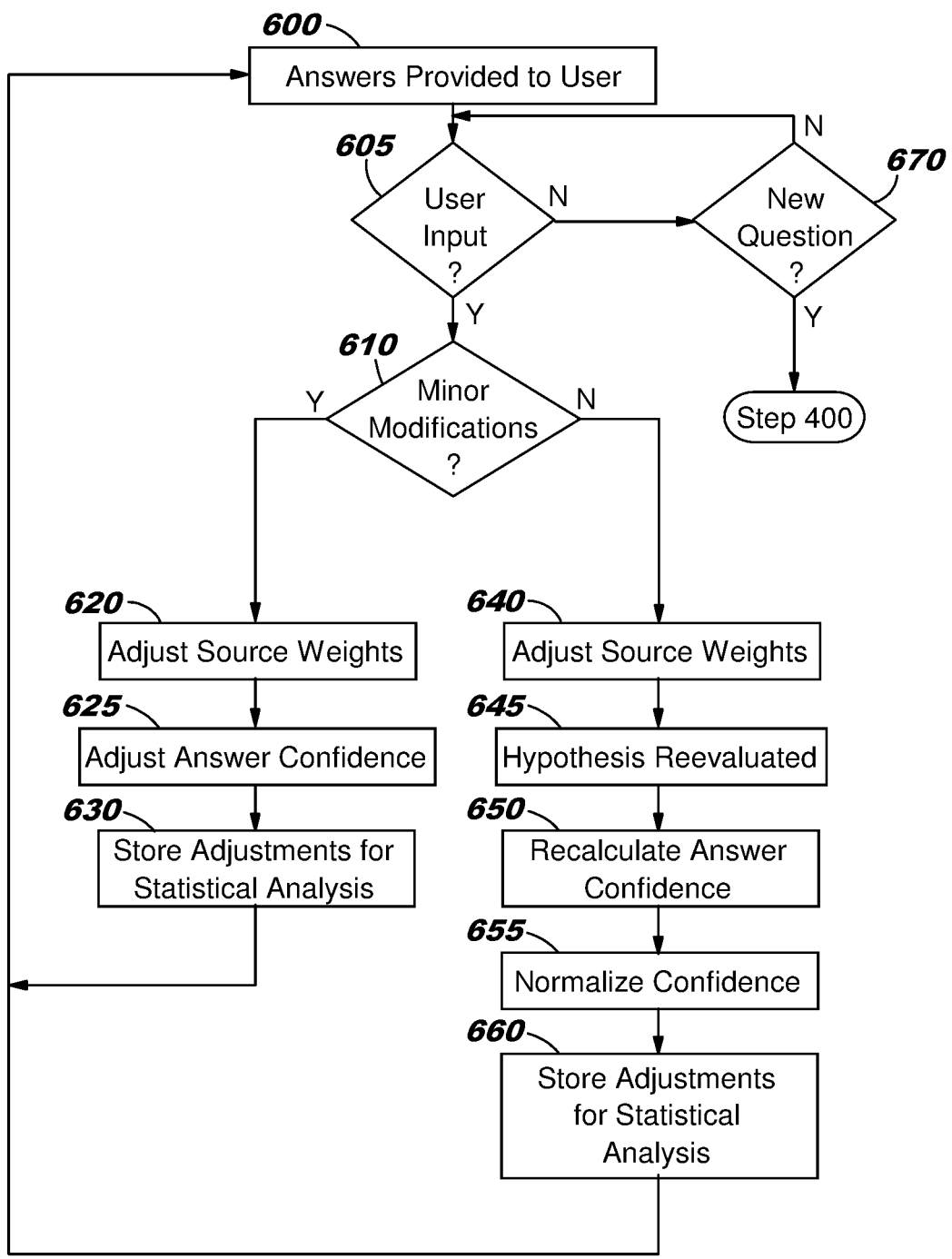
FIG. 6 is a flow diagram of a user providing input to an answer in which various embodiments may be implemented.

FIG. 6 is a flow diagram of a user providing input to an answer in which various embodiments may be implemented. This described process assumes that the user is provided supporting, neutral and disputing answers to the user query such as shown with reference to FIG. 7A below, although alternative embodiments may utilize other formats.

In a first step 600, corresponding to step 470 above, a set of answers are provided to the user through a user interface. In this embodiment, these answers include supporting answers, neutral answers, and disputing answers, each answer corresponding to specific evidence with a ranking, weight and other supporting information. The overall confidence (e.g., statistical) of the main answer can be provided. The confidence of other answers may also be provided. Alternative embodiments may utilize more or fewer categories of answers, including just supporting answers.

Then in step 605, it is determined whether the user has provided any rating or ranking input through the user interface. Rating input is when the user changes the rating of a given answer from neutral to supporting or disputing, or vice versa. Ranking input is when the user changes the ranking of a given answer and its supporting evidence. This input can be to adjust the rating and ranking of an answer and its supporting evidence. If yes in step 605, then processing continues to step 610, otherwise processing continues to step 670.

In step 610, it is determined whether the user input is minor or major. That is, a minor change may require minor changes to the confidence of the current answer and a major change may require reanalyzing the set of answers provided to the user. For example, ranking input may be considered minor and rating input considered major. Other factors may be considered such as whether a rating modification was minor or major. That is, a rating change from neutral to supporting may be considered minor whereas a rating change from disputing to supporting may be considered major. Other factors may be utilized to make this determination such as whether there is strong confidence in the current answer or not. This determination may be modified dynamically based on statistical analysis of prior modifications. If minor, then processing continues to step 620, otherwise processing continues to step 640.

In step 620, the modified ratings and rankings are then used to statistically adjust the weight of the source of supporting evidence for each answer. This may be performed by the answer analyzer. For example, if an answer with supporting evidence has a weight of 72 is ranked higher than an answer with supporting evidence having a weight of 80, then the supporting evidence with the weight of 72 is increased and the supporting evidence with the weight of 80 is reduced. For example, the 72 weight may be increased to 76 and the 80 weight reduced to 75, thereby complying with the new ranking. Alternatively, the user may type in or otherwise provide a weighting for the supporting evidence.

Then in step 625, the overall confidence in the main answer is adjusted based on the user input adjusted rankings and ratings user input. If the confidence in the individual answers are shown, then they are also adjusted accordingly. Then processing returns to step 630.

In step 630, these updated ratings and rankings are stored in memory for statistical analysis, either immediately or at a later time period with other adjusted ratings and rankings. For example, if a source of supporting evidence such as a particular article or a certain publication is consistently re-ranked lower, then that article or publication may then be lowered in strength as a source of supporting evidence. Processing then returns to step 600 to display the updated answers for the user and for obtaining any additional user input.

If there were major modifications identified in step 610, then processing proceeds to step 640. That is, greater processing of the supporting evidence and the answers is needed to handle these major modifications. In this embodiment, a modified merge function is performed. In step 640, the modified ratings and rankings are then used to statistically adjust the weight of the source of supporting evidence for each answer. This may be performed by the answer analyzer. For example, if an answer with supporting evidence has a weight of 72 is ranked higher than an answer with supporting evidence having a weight of 80, then the supporting evidence with the weight of 72 is increased and the supporting evidence with the weight of 80 is reduced. For example, the 72 weight may be increased to 76 and the 80 weight reduced to 75, thereby complying with the new ranking. Alternatively, the user may type in or otherwise provide a weighting for the modified rankings. Processing then continues to step 645.

In step 645, the first and second set of hypotheses are re-evaluated based on the based on the adjusted weight of their supporting evidence. This allows for the reassessment of all answers, including any not displayed to the user. For example, by increasing the weight of a particular source of evidence, the confidence in other answers utilizing that same source may also be reweighted through this process, causing other answers to be ranked lower or higher even though they were apparently unconnected to the user input. Then in step 650, the confidence of the answers provided for each hypothesis is recalculated. The confidence in the answers is then normalized in step 655. Then in step 660, these updated ratings and rankings are stored in memory for statistical analysis, either immediately or at a later time period with other adjusted ratings and rankings. For example, if a source of supporting evidence such as a particular article or a certain publication is consistently re-ranked lower, then that article or publication may then be lowered in strength as a source of supporting evidence. Processing then returns to step 600 to display the updated answers for the user and for obtaining any additional user input. In an alternative embodiment, processing could have returned from step 660 to step 430 of FIG. 4 when a major modification is provided by the user.

In step 670, it is determined whether the user has provided a new question for analysis. This question may be a totally new query by the user, or it may be a variation of the original query from the user. If yes, then processing returns to step 400 of FIG. 4 as described above, otherwise processing returns to step 605 to await user input.

Many other variations of the user interface may be utilized. For example, the answers may be displayed utilizing various information visualization techniques such as a heat map, a word cloud, etc. Also, the user may be able to click on or touch a particular answer to display greater detail of that answer, thereby allowing the user to drill down through the information provided. Also, scrolling may be utilized to allow additional answers to be displayed.

Figure 7A:
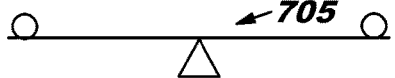
FIGS. 7A-7D are illustrations of a user interface for a user to provide input to an answer in which various embodiments may be implemented.

FIGS. 7A-7D are illustrations of a user interface for a user to provide input to an answer in which various embodiments may be implemented. FIG. 7A illustrates a user interface 700 where the user has asked a question, but that question has not been processed yet. User interface 700 includes a user query area 702 with the user query entered by the user. The user may provide the user query by typing a question in that area, by verbally asking a question for voice recognition, or by using other data entry techniques. Alternatively the user query may have been asked elsewhere and then added to this area when the user interface was invoked as a result. In answer area 704, a pro answer A1 may be provided on the left, a con (e.g., contrary) answer A2 on the right, with a confidence indicator 705 displayed in the middle. Confidence indicator 705 is displayed as a seesaw with a fulcrum in the middle and balls indicating the relative confidence levels of each answer. Given that the user query has not been processed yet, the pro and con answers are blank and the confidence indicator is level. Other types of confidence indicators may be utilized. The supporting answers 706 are then shown on the left, the neutral answers 707 shown in the middle, and the disputing answers 708 shown on the right. These will be explained in greater detail below. Also shown is a user asking area 709 where the user can provide a new user query for processing. Any new user query may be unrelated to the current user query, or may be a related question based on the answers provided for the user query 702.

Figure 7B:
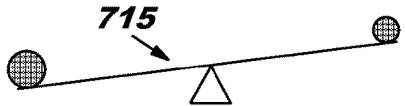

FIG. 7B illustrates the same user interface 710 and user query 712 as FIG. 7A except that the user query has been processed. In answer area 714, the cumulative pro answer is shown on the left and the cumulative con answer is shown on the right. Confidence indictor 715 is heavily balanced to the left with a larger ball on that side indicating that the pro answer has a much greater confidence level. A numerical confidence level may also be provided. Supporting 716, neutral 717, and disputing 718 answers are shown below. There are three supporting answers 716a, 716b and 716c in ranked order, each with a quote from their supporting evidence, the weight of their supporting evidence, the latest (or earliest) date of that supporting evidence, and a reference link to that supporting evidence. The reference link can be clicked or otherwise selected by the user, and the supporting evidence can be displayed for review by the user. The supporting evidence can be displayed in a separate window or other location for review by the user. In addition, each supporting answer has an X that the user can select for deleting that answer. There are two neutral answers 717a and 717b as well as three disputing answers 718a, 718b and 718c, each similarly configured as the supporting answers 716. User interface 710 can also include a scrolling capability to allow the user to view more answers than shown in this illustration. At this point, the user has not asked a question in user asking area 719.

Figure 7C:

FIG. 7C illustrates the same user interface 720 and user query 722 as illustrated in FIG. 7B, except that user modifications are shown, including changing answer ratings and rankings as well as any answer deletions. However, those user modifications have not been processed yet in FIG. 7C. The user can indicate these user modifications with a variety of techniques. For example, if the user interface is displayed on a touch screen. The user can just use finger motions on the display surface to slide answers to a desired locations, thereby indicating rating or ranking changes, or to touch an X to indicate deleting an answer. Other methods could involve utilizing a mouse to click, move and drop answers to a desired location or to click an X to indicate deleting an answers. Other types of user indications can be utilize to indicate user modifications. In a first indication 730, a user has selected the deletion X in answer area 728a, indicating that that answer should be deleted. In a second indication 732, the user has slid answer 727b from neutral column 727 to disputing column 728 between answers 728b and 728C. In a third indication 734, the user has slid answer 726c up between answers 726a and 726b.

Figure 7D:

These three user modifications 730, 732 and 734 are then processed as described in FIG. 6 above and displayed as shown in FIG. 7D. As can be seen disputing answer 728a has been deleted and there is no corresponding 748a. Disputing answer 728b is now the strongest disputing answer 748b. Neutral answer 727b is now the second strongest disputing answer 747b. Its weight has not changed as it is still greater than or equal to disputing answer 748c. Supporting answer 726c is now the second strongest supporting answer 746c with an increased weight of 81. Supporting answer 726b is now the third strongest supporting answer 746c with a decreased weight of 80. Because of these changes, in answer area 744, the pro answer is now more confident and the con answer is less confident. As a result, confidence indicator 745 shows a larger pro ball and a smaller con ball illustrating those changes in confidence. Other types of user interfaces may be utilized to inform the user of the strength and weakness of answers, allow the user to make modifications to the relative weights of the supporting evidence, and display the effect of those changes to the user.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code such as for utilizing a user interface to augment a query answering system. A client data processing system may download that computer usable code, such as for storing on a data storage medium associated with the client data processing system, or for using in the client data processing system. The server data processing system may similarly upload computer usable code from the client data processing system such as a content source. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

The terminology used herein is for the purpose of describing particular embodiments and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for providing an answer to a user query comprising:
- receiving, by a system, a natural language query from a user;
- applying, by the system, natural language processing (NLP) to the query to generate a first set of NLP structures representing a first set of synonymous variations of the user query;
- generating, by the system, a contrary set of NLP structures contrary to the user query and representing a second set of synonymous variations contrary to the user query;
- converting, by the system, the contrary set of NLP structures to a set of natural language contrary queries for presentation to the user and for obtaining any user modifications to the set of natural language contrary queries;
- responsive to receiving user modifications to the set of natural language contrary queries, applying NLP to the user modifications and modifying the contrary set of NLP structures;
- evaluating, by the system, the first set of NLP structures to identify a first set of evidence;
- evaluating, by the system, the contrary set of NLP structures to identify a second set of evidence;
- evaluating, by the system, a first set of hypotheses from the first set of NLP structures based by the first set of evidence, and a contrary set of hypotheses from the contrary set of NLP structures based by the second set of evidence, to determine a set of answers to the user query;
- converting, by the system, the set of answers to natural language;
- providing, by the system, the converted set of answers to the user;
- obtaining, by the system, user modifications to the converted set of answers, wherein the user modifications include changing a corresponding rating of an answer in the converted set of answers by moving the answer to a desired location within a supporting column, a neutral column, and a disputing column; and
- providing, by the system, based at least in part, on the user modifications, an updated set of answers and a confidence indicator illustrating any change in the corresponding ratings of the answers in the converted set of answers.

2. The method of claim 1 further comprising providing a user interface for the user to examine the first and second set of evidence.

3. The method of claim 1 further comprising providing to the user the first and second set of synonymous variations categorized into supporting, neutral and disputing answers.

4. The method of claim 3 wherein the provided synonymous variations are provided with weights of the supporting evidence for each synonymous variation.

5. The method of claim 1 wherein the user modifications are utilized to train the system.

6. The method of claim 1 wherein the contrary set of NLP structures are generated prior to evaluating the first set of NLP structures.

7. The method of claim 1 further comprising:
- subsequent to presenting the set of natural language contrary queries to the user, receiving modifications to the natural language query from the user;
- responsive to receiving user modifications to the natural language query, applying NLP to the user modifications to the natural language query and modifying the first set of NLP structures and the contrary set of NLP structures.

8. A computer program product for providing an answer to a user query, the computer program product comprising a computer readable storage medium having program instructions embodied therewith, the program instructions executable by a processing circuit to cause the device to perform a method comprising:
- receiving, by a system, a natural language query from a user;
- applying, by the system, natural language processing (NLP) to the query to generate a first set of NLP structures representing a first set of synonymous variations of the user query;
- generating, by the system, a contrary set of NLP structures contrary to the user query and representing a second set of synonymous variations contrary to the user query;
- converting, by the system, the contrary set of NLP structures to a set of natural language contrary queries for presentation to the user and for obtaining any user modifications to the set of natural language contrary queries;
- responsive to receiving user modifications to the set of natural language contrary queries, applying NLP to the user modifications and modifying the contrary set of NLP structures;
- evaluating, by the system, the first set of NLP structures to identify a first set of evidence;
- evaluating, by the system, the contrary set of NLP structures to identify a second set of evidence;
- evaluating, by the system, a first set of hypotheses from the first set of NLP structures based by the first set of evidence, and a contrary set of hypotheses from the contrary set of NLP structures based by the second set of evidence, to determine a set of answers to the user query;
- converting, by the system, the set of answers to natural language;
- providing, by the system, the converted set of answers to the user;
- obtaining, by the system, user modifications to the converted set of answers, wherein the user modifications include changing a corresponding rating of an answer in the converted set of answers by moving the answer to a desired location within a supporting column, a neutral column, and a disputing column; and
- providing, by the system, based at least in part, on the user modifications, an updated set of answers and a confidence indicator illustrating any change in the corresponding ratings of the answers in the converted set of answers.

9. The computer program product of claim 8 further comprising providing a user interface for the user to examine the first and second set of evidence.

10. The computer program product of claim 8 further comprising providing to the user the first and second set of synonymous variations categorized into supporting, neutral and disputing answers.

11. The computer program product of claim 10 wherein the provided synonymous variations are provided with weights of the supporting evidence for each synonymous variation.

12. The computer program product of claim 8 wherein the contrary set of NLP structures are generated prior to evaluating the first set of NLP structures.

13. The computer program product of claim 8 further comprising:
  subsequent to presenting the set of natural language contrary queries to the user, receiving modifications to the natural language query from the user;
  responsive to receiving user modifications to the natural language query, applying NLP to the user modifications to the natural language query and modifying the first set of NLP structures and the contrary set of NLP structures.

14. A data processing system for providing an answer to a user query, the data processing system comprising:
  a processor; and
  a memory storing program instructions which when executed by the processor execute the steps of:
  receiving, by the system, a natural language query from a user;
  applying, by the system, natural language processing (NLP) to the query to generate a first set of NLP structures representing a first set of synonymous variations of the user query;
  generating, by the system, a contrary set of NLP structures contrary to the user query and representing a second set of synonymous variations contrary to the user query;
  converting, by the system, the contrary set of NLP structures to a set of natural language contrary queries for presentation to the user and for obtaining any user modifications to the set of natural language contrary queries;
  responsive to receiving user modifications to the set of natural language contrary queries, applying NLP to the user modifications and modifying the contrary set of NLP structures;
  evaluating, by the system, the first set of NLP structures to identify a first set of evidence;
  evaluating, by the system, the contrary set of NLP structures to identify a second set of evidence;
  evaluating, by the system, a first set of hypotheses from the first set of NLP structures based by the first set of evidence, and a contrary set of hypotheses from the contrary set of NLP structures based by the second set of evidence, to determine a set of answers to the user query;
  converting, by the system, the set of answers to natural language;
  providing, by the system, the converted set of answers to the use;
  obtaining, by the system, user modifications to the converted set of answers, wherein the user modifications include changing a corresponding rating of an answer in the converted set of answers by moving the answer to a desired location within a supporting column, a neutral column, and a disputing column; and
  providing, by the system, based at least in part, on the user modifications, an updated set of answers and a confidence indicator illustrating any change in the corresponding ratings of the answers in the converted set of answers.

15. The data processing system of claim 14 further comprising providing a user interface for the user to examine the first and second set of evidence.

16. The data processing system of claim 14 further comprising providing to the user the first and second set of synonymous variations categorized into supporting, neutral and disputing answers.

17. The data processing system of claim 14 wherein the contrary set of NLP structures are generated prior to evaluating the first set of NLP structures.

18. The data processing system of claim 14 further comprising:
  subsequent to presenting the set of natural language contrary queries to the user, receiving modifications to the natural language query from the user;
  responsive to receiving user modifications to the natural language query, applying NLP to the user modifications to the natural language query and modifying the first set of NLP structures and the contrary set of NLP structures.

* * * * *